(12) United States Patent
Bamberger et al.

(10) Patent No.: US 9,979,191 B2
(45) Date of Patent: May 22, 2018

(54) POWER CONTROL METHOD, DEVICE AND SYSTEM FOR INSTIGATING A POWER CONTROL BASED ON THE EXAMINED ALLOCATION

(75) Inventors: Joachim Bamberger, Munich (DE); Silvio Becher, Munich (DE); Dagmar Beyer, Munich (DE); Jan-Gregor Fischer, Zorneding (DE); Clemens Hoffmann, Kassel (DE); Steffen Lamparter, Feldkirchen (DE); Michael Metzger, Markt Schwaben (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 631 days.

(21) Appl. No.: 14/410,337

(22) PCT Filed: Jun. 22, 2012

(86) PCT No.: PCT/EP2012/062137
§ 371 (c)(1),
(2), (4) Date: Dec. 22, 2014

(87) PCT Pub. No.: WO2013/189552
PCT Pub. Date: Dec. 27, 2013

(65) Prior Publication Data
US 2015/0340865 A1    Nov. 26, 2015

(51) Int. Cl.
*G05D 17/00* (2006.01)
*H02J 3/00* (2006.01)
(Continued)

(52) U.S. Cl.
CPC .............. *H02J 3/008* (2013.01); *G05B 15/02* (2013.01); *G06Q 50/06* (2013.01); *Y04S 50/10* (2013.01)

(58) Field of Classification Search
None
See application file for complete search history.

(56) References Cited

U.S. PATENT DOCUMENTS

| 8,090,479 B2 | 1/2012 | El-Gasseir et al. |
| 2010/0076618 A1 | 3/2010 | El-Gasseir et al. |
| 2010/0306097 A1* | 12/2010 | Greiner .................. G06Q 40/04 705/37 |

FOREIGN PATENT DOCUMENTS

| CN | 101803138 A | 8/2010 |
| WO | 2009040140 A1 | 4/2009 |

OTHER PUBLICATIONS

Oren Shmuel et al: "Nodal Prices and Transmission Rights: critical appraisal", The Electricity Journal, vol. 8,, Dec. 31, 2002 (Dec. 31, 2002), pp. 24-35, XP55036149, DOI: 10.1016/1040-6190(95)90198-1 found in the Internet: URL:http://ac.els-cdn.com/104619095901981/1-s2.0-1040619095901981-main.pdf?_tid=9c918621766b4e39cdbe571aa0b2476f&acdnat=1345707950_0baa2e875dc7c285c640fab01f78c4aa [found on Aug. 23, 2012].

(Continued)

*Primary Examiner* — Wissam Rashid
(74) *Attorney, Agent, or Firm* — Laurence Greenberg; Werner Stemer; Ralph Locher

(57) ABSTRACT

A novel power allocation method, as early as in the procurement of electricity, takes account of network congestion and simultaneously enables logical and physical separation of network control and power allocation. An allocation component and a network monitoring component separately from one another detect tasks relating to the allocation of power and via predetermined interfaces exchange information or intermediate states relating to the allocation before the allocation is actually implemented for power control. This enables adaptive power control of power sources and consumer units and the flexible implementation of a plurality of requirements of a modern power distribution network.

13 Claims, 1 Drawing Sheet

(51) Int. Cl.
*G05B 15/02* (2006.01)
*G06Q 50/06* (2012.01)

(56) References Cited

OTHER PUBLICATIONS

R.K. Singh et al: "Optimum allocation of distributed generations based on nodal pricing for profit, loss reduction, and voltage improvement including voltage rise issue", International Journal of Electrical Power & Energy Systems, vol. 32, No. 6, Jul. 1, 2010 (Jul. 1, 2010), pp. 637-644, XP55036198, ISSN: 0142-0615, DOI: 10.1016/j.ijepes.2009.11.021.
P.M. Sotkiewicz et al: "Nodal Pricing for Distribution Networks: Efficient Pricing for Efficiency Enhancing DG", IEEE Transactions on Power Systems, vol. 21, No. 2, May 1, 2006 (May 1, 2006), pp. 1013-1014, XP55036213, ISSN: 0885-8950, DOI: 10.1109/TPWRS.2006.873006.

\* cited by examiner

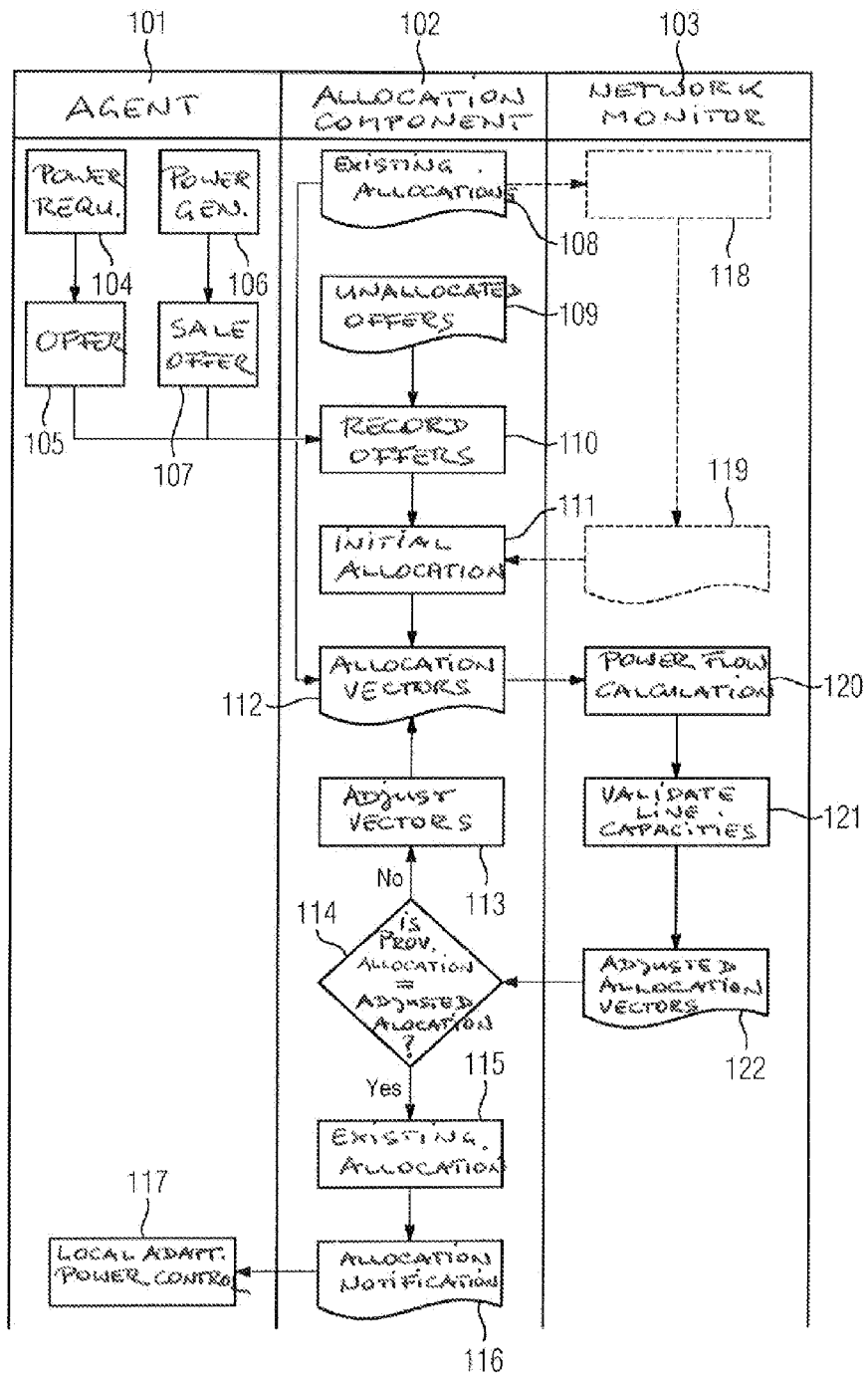

POWER CONTROL METHOD, DEVICE AND SYSTEM FOR INSTIGATING A POWER CONTROL BASED ON THE EXAMINED ALLOCATION

BACKGROUND OF THE INVENTION

Field of the Invention

The invention relates to a method and devices for power control, and also a corresponding system. The invention enables an efficient allocation of electrical power.

The increasing feed-in of renewable, fluctuating energies at distribution network level can result in network congestion which can only be compensated by a significant expansion of the network infrastructure or by retaining high balancing energy stocks. Both network expansion and retention of balancing energy incur considerable costs which oppose the economical and sustainable operation of renewable energies.

Liberalization of the power markets demands a decoupling of the different roles in the power market. Thus, functionalities for network operation are offered separately from energy generation and supply by different players. In particular, an optimum network management with maximum economic efficiency is hindered by a legally prescribed separation of network operation and power supply. For example, the distribution network operator is concerned with the line restrictions in the distribution network (e.g. due to load reduction in an emergency), but has no influence on the allocation of power in the power markets.

In order to enable a seamless integration of fluctuating feed-in at distribution network level, local power markets can be introduced which ensure an efficient allocation of feed-in and consumption rights. While capacity restrictions are given considerable attention at transmission network level, approaches for distribution networks assume that network capacities are available in sufficient quantity or a network management takes place through use of balancing energy during operation.

An explicit trading of power transmission rights is known: Thus, in addition to the market-based coordination of the power allocation, transmission rights are explicitly acquired, i.e. the free capacities of the transmission lines are sold on a second market.

An implicit consideration of transmission line capacity in the allocation is also known (pool-based power markets, zone-based pricing): In a market model of this type, the transmission network limitations are also already taken into account in the allocation determination in the power market. This can take place for the entire network area (nodal pricing) or for individual, intrinsically homogeneous network areas which are extracted as copper plate (zonal pricing). A condition here is that the power market operator and the transmission network operator are one and the same player and can combine information from both areas. This approach is applied, inter alia, in the USA (PJM Interconnection, ERCOT, New York, New England) and in New Zealand.

However, allocation methods of this type cannot be used without problems in the distribution network area, because
  in the distribution network area, no market-based allocation has hitherto taken place (the allocation is coordinated by means of long-term generation plans and load profiles);
  in the distribution network, no player has a complete knowledge of the network topology and utilization and the current allocation requirements of the generators and consumers;
  in the transmission network, unlike the distribution network, short-term changes in supply and demand play no part, or only a subordinate part, and thus remain largely ignored; the transmission network, unlike the distribution network, is typically relatively simply divided up into zones separated from one another, whereas distribution networks are more tightly meshed and a division into independent zones is difficult.

The problem therefore essentially exists that a strict separation of network control components and market components is to be maintained in distribution networks. This makes existing approaches unviable for distribution networks, since central regulatory requirements are not met, but also a complete overlap of areas must be provided in terms of network control and market responsibility.

BRIEF SUMMARY OF THE INVENTION

The object of the invention is to avoid the aforementioned disadvantages and, in particular, to indicate an efficient solution for an energy allocation method for a distribution network.

This object is achieved according to the features of the independent claims. Preferred embodiments can be derived, in particular, from the dependent claims.

To achieve the object, a method for power control is proposed,
  in which an allocation of the electrical power is determined by an allocation component on the basis of offers,
  in which the allocation of a network monitoring component is provided,
  in which a feasibility of the allocation is checked by the network monitoring component,
  in which a checked allocation of the allocation component is provided by the network monitoring component on the basis of the feasibility of the allocation,
  in which a power control is instigated on the basis of the checked allocation.

The solution proposed here is applicable to different energy networks, e.g. power networks, heat networks or gas networks.

The components mentioned here may be hardware or software units. In particular, the components may be located in the form of programs in different or in common hardware. It is also possible that one of the aforementioned components is implemented in each case in one or in a plurality of physical units; for example, the components may be designed as partially or completely distributed and may have corresponding communication connections for the data exchange (with one another). For example, the components can exchange data over a communication network, e.g. the Internet. These details for the components also apply to the agents explained below. An agent of this type is, e.g. a process or component, in particular a software program which runs or is capable of running on hardware.

A power allocation method is accordingly proposed which, e.g. already in the power procurement, takes account of network congestion and simultaneously enables logical and physical separation of network control and power allocation.

The proposed approach meets, in particular, the following requirements:

rewarding of short-term responses to changes in relation to supply and demand, and/or network topology giving preference to allocations which enable an improvement in network utilization transparency of the allocation method (an unwanted strategic behavior should, as far as possible, be prevented here)

applicability of the allocation method to the entire network area (e.g. a division into individual homogeneous areas is to be avoided)

support of continuous allocation methods: Purchase or sale requests are preferably to be processed at all times (or virtually at all times) without collecting them and then processing them jointly at specific times consideration of regulatory provisions for separating the network area and energy supply.

In a further development, the requirements comprise at least one purchase offer and/or at least one sale offer.

In a different further development, the feasibility of the allocation is checked by the network monitoring component in that a validation of utilized line capacities is carried out by the network monitoring component, in particular on the basis of a power flow calculation.

In a particular further development, the allocation of the electrical power is determined by the allocation component on the basis of the offers and on the basis of at least one of the following factors which are determined by the network monitoring component:

a power flow calculation, available capacities, power transfer distribution factors.

Also in a further development, the power control is instigated on the basis of the checked allocation in that a condition is checked by the allocation component to determine whether the checked allocation of the network monitoring component corresponds to the allocation of the allocation component and/or the capacity of the network is not jeopardized, in which the checked allocation is taken over by the allocation component if the condition applies, in which the allocation is adjusted if the condition does not apply.

The allocation can be adjusted by the allocation component, wherein a check can be carried out in turn by the network monitoring component to determine whether the adjusted allocation complies with predetermined parameters (e.g. network capacity, etc.). The method can thus be carried out iteratively until a suitable allocation is found.

Moreover, in a further development, at least one offer is provided by at least one agent.

The agent is e.g. a component to which the above details also apply in terms of possible example embodiments.

In an additional further development, an allocation requirement for at least one locally connected device is determined by the agent.

In a next further development, the power control of the at least one locally connected device is carried out by the agent.

The locally connected device may be an energy generator (e.g. a wind turbine, a solar power unit, a power station, etc.), energy stores (e.g. a battery, a pump store, etc.) or a consumer. In particular, the connected device can act partially as an energy supplier and partially as a consumer (e.g. in the case of an energy store which, in a first operating mode, is charged from the power network and, in a second operating mode, provides the power network with energy).

In one design, the power control is carried out on the basis of an allocation notification which is provided by the allocation component.

An allocation notification of this type can be evaluated and implemented accordingly by the agent.

In an additional embodiment, the checked allocation of the allocation component is provided by the network monitoring component, an adjustment of the allocation is carried out in the allocation component on the basis of the checked allocation.

In an alternative design, the checked allocation of the allocation component is provided by the network monitoring component, an adjustment of the allocation is carried out in the network monitoring component on the basis of the checked allocation.

It should be noted here that the steps of the method can be carried out essentially in any sequence.

The aforementioned object is also achieved by means of a device for power control with a processing unit which is configured in such a way that an allocation of the electrical power can be determined on the basis of offers from at least one agent, the allocation of a network monitoring component can be provided, a checked allocation can be received by the network monitoring component, a power control can be instigated on the basis of the checked allocation.

The device is, in particular, an allocation component.

Furthermore, the aforementioned object is achieved by means of a device for power control with a processing unit which is configured in such a way that an allocation can be received from an allocation component, a feasibility of the allocation can be checked, a checked allocation of the allocation component can be provided on the basis of the feasibility of the allocation, wherein a power control can be instigated on the basis of the checked allocation.

The device is, for example, a network monitoring component.

Furthermore, to achieve the aforementioned object, a system for power control is proposed with an allocation component by means of which an allocation of the electrical power can be determined on the basis of offers, with a network monitoring component to which the allocation can be provided, wherein a feasibility of the allocation can be checked by the network monitoring component and wherein a checked allocation of the allocation component can be provided by the network monitoring component, wherein a power control can be instigated on the basis of the checked allocation.

In a further development, the system has at least one agent, wherein at least one offer can be provided by the at least one agent.

The details provided above relating to the method apply accordingly to the devices and the system.

The solution proposed here furthermore comprises a computer program product which is directly loadable into a memory of a digital computer, comprising program code parts which are suitable for carrying out steps of the method described here.

Furthermore, the aforementioned problem is solved by means of a computer-readable storage medium, e.g. any given memory, comprising instructions executable by a computer (e.g. in the form of program code), which are suitable for the computer to carry out steps of the method described here.

The characteristics, features and advantages of this invention described above and the manner in which these are achieved will become clearer and more readily understandable in connection with the following schematic description of example embodiments, which are explained in detail in connection with the drawing.

BRIEF DESCRIPTION OF THE DRAWING

In the drawing:
The FIGURE shows a schematic flow diagram of a power allocation method, subdivided into the components of agent, allocation component and network monitoring component.

DESCRIPTION OF THE INVENTION

The components of the power allocation method (in the context of a method for power control) are described by way of example below, wherein, with said method, network congestion is already taken into account in the power procurement, said method simultaneously enabling a logical and physical separation of network control and power allocation.

(a) An agent ("Personal Energy Agent") is a component which, for a network connection in the distribution network, performs tasks of information collection, processing and forwarding in relation to power allocation and implements the information exchange with the allocation component. Not every connection point in the distribution network needs to be represented by an agent. The agent determines the allocation requirement for locally managed devices and controls them according to the allocation result.

(b) An allocation component ("Balancing Master") coordinates the power generation and power removal within the distribution network by means of market-based methods. The agents notify their power requirement or the planned power generation to the allocation component, together with a value estimate or costs. The allocation component preferably receives information (only) from a connection point which is also provided with an agent.

(c) A network monitoring component ("Network Transport Agent") monitors a network status. It aggregates (e.g. available) measurement values and network parameters and from these estimates the instantaneous network status or a loading of the network equipment and checks, in particular, the allocations of the allocation component for compliance with network capacity boundary conditions.

(d) A network control component ("Area Administrator") intervenes as soon as a critical network status is reached. Possible actions comprise a load shedding, an increase/reduction in the feed-in, a connection/disconnection of generators, an injection of reactive power or a change in the network topology. The network control component is optional, since it, in particular, carries out a downstream monitoring of the network boundary conditions. The transport-capacity-based allocation is carried out, for example, in an overlaid control circuit and is overwritten as required by the network control component.

An example of the process of the power allocation method is shown below:

(1) A power requirement determination or a power generation determination is carried out on the basis of an operating condition of locally managed devices, the result of forecasting methods and/or load or generation profiles. The result of the power requirement determination is purchase offers for power which indicate the quantity and maximum price (according to the value estimate) for a given time period. The result of the power generation determination is sales offers for power which indicate the quantity and minimum price (according to the generation costs) for a given time period. Purchase offers and sale offers are sent by the agent to the allocation component.
Player: agent
Input (input variable): e.g. weather forecasts as a basis for forecasting generation and consumption
Output (output variable): purchase offers (quantity, maximum price), sales offer (quantity, minimum price)

(2) Registering of the offers as unallocated offers: The received purchase offers and sales offers are recorded in a suitable data memory, which, if necessary, also comprises offers not yet allocated from previous processing steps. The quantity of the offers hitherto unallocated is made accessible for subsequent processing steps.
Player: allocation component
Input: purchase offers, sales offers, unallocated offers (order book)
Output: unallocated offers (3) Optional: initial power flow calculation: On the basis of the existing allocation, the network monitoring component calculates the power flow which is expected at the given time of the allocation. It sends the line capacities still available in the distribution network to the allocation component and also "Power Transfer Distribution Factors" (PTDFs).
Player: network control component
Input: existing allocation vectors
Output: available line capacities in the distribution network, PTDFs (4) Allocation method based on the quantity and price information: The allocation component produces a provisional allocation on the basis of the price and quantity information of the hitherto unallocated offers of the agents. A distinction can be made here between two variants:

(i) The allocation component extends the existing allocation incrementally by means of the allocation most appropriate from an economic perspective of a purchase offer with one or more sales offers. This provisional allocation is supplied to the further processing steps. As soon as a final decision has been made regarding the permissibility of the provisional allocation, the determination of the next economically most appropriate allocation is carried out.

(ii) The allocation component extends the existing allocation by all possible purchase offer and sales offer pairs. The total quantity of the provisional allocations is validated in a step and the quantity of the permissible allocations is taken over as the existing allocation.
Optional: if the initial power flow calculation according to (3) has been carried out, the allocation can be carried out taking account of the still available line capacities and the PTDFs. The result of this allocation represents, for example, the final allocation result.

Player: allocation component
Input: purchase offers, sales offers, existing allocation vectors, optionally line capacities.
Output: existing and provisional allocation vectors (5) Power flow calculation: the provisional allocations, combined with the existing allocations, provide the basis for determining the network utilization at a given time.
Player: network monitoring component
Input: existing and provisional allocation vectors
Output: power flow (6) Validation according to line capacities: the allocation most appropriate from an economic perspective is validated according to the line capacities. Since the necessary network-specific information is present in the network monitoring component, the validation is preferably carried out there. Infringements of the line limitation are determined on the basis of the power flow and known line capacities. Two alternatives exist for the further process:
  (i) The provisional allocations are already adjusted in the network monitoring component, i.e. the allocated quantity is reduced so that the line capacities are not exceeded. This modified, infringement-free allocation is sent back to the allocation component.
  (ii) The network monitoring component sends information to the allocation component relating to infringements of the line limits and the allocations thereby affected. The allocations are then adjusted in the allocation component itself.
Player: network monitoring component
Input: power flow
Output: adjusted provisional allocation vectors which, together with the existing allocations, produce a power flow which lies within the capacity limits (alternatively: capacity infringements)

(7) Adjustment of the provisional allocation vectors on the basis of the price information: The allocation component uses the price information sent by the agents and the allocation vectors validated by the network monitoring component (or the information relating to capacity infringements) in order to calculate a new, economically appropriate allocation. A new appropriate buyer/seller pair is thus sought on the basis of the price information for the part of the provisional allocation which the network component has removed from the allocation due to capacity infringements. The new provisional allocation is in turn sent with the existing allocation vectors to the network control component which carries out a further check.
Player: allocation component
Input: adjusted allocation vectors (alternatively: capacity infringements)
Output: validated provisional allocation vectors (8) Takeover as existing allocation: if it was possible to establish one or more complete or partial allocations between sale and purchase offers which do not infringe any line limitations, the allocation component incorporates the corresponding allocations into the quantity of internally stored existing allocations. Existing allocations preferably remain unchanged. If only a partial allocation could be carried out, the corresponding purchase and sale offers are adjusted. In addition, the allocation component notifies the agents concerned through the dispatch of allocation notifications.
Player: allocation component
Input: validated provisional allocation vectors
Output: allocation notification (9) Local adaptive power control: The agent controls the power generation or power consumption of its (locally) managed devices according to the allocation which it has received in the allocation determination.
Player: agent
Input: allocation notification
Output: not required FIG. 1 shows a schematic flow diagram of a power allocation method of this type, subdivided into the components of agent 101, allocation component 102 and network monitoring component 103.

The agent 101 carries out a power requirement determination 104 and determines a result therefrom as a purchase offer 105 (with parameters of quantity and maximum price) and sends it to the allocation component 102.

Furthermore, the agent 101 carries out a power generation determination 106, from which it determines a sale offer 107 (with parameters of quantity and minimum price) and sends it to the allocation component 102.

In a step 110, the allocation component 102 records the offers as not yet allocated offers (order book), comprising existing unallocated offers 109 and the purchase offers 105 and the sale offers 107.

In a step 111, an initial allocation method is carried out by the allocation component 102 on the basis of the price information. Existing and provisional allocation vectors 112 are obtained from step 111; existing allocations 108 may be predefined by the allocation component 102 in the form of generator vectors and/or consumer vectors.

The existing allocations 108 can optionally be sent to the network monitoring component 103 and can be used in a step 118 for the initial power flow calculation. This step 118 provides available transfer capacities and PTDFs, which in turn can optionally be supplied to step 111.

The existing and provisional allocation vectors 112 are sent to the network monitoring component 103 and are used there in a power flow calculation 120. A validation of the line capacities is then carried out in the network monitoring component 103 in a step 121. The result of step 121 provides adjusted allocation vectors 122, which are validated according to predefined capacity limits; alternatively, a capacity infringement can also be determined.

In a query 114, the allocation component 102 checks whether the provisional allocation is equal to the adjusted allocation or whether the capacity is not infringed (e.g. exceeded). If the result of the query 114 is negative, the method branches to a step 113 wherein an adjustment of the provisional allocation vectors is carried out on the basis of the price information by the allocation component 102. If the result of the query 114 is positive, the takeover as the existing allocation is effected in a step 115 of the allocation component 102, and an allocation notification 116 is sent to the agent 101, where a local adaptive power control takes place in a step 117.

EXAMPLE

An example embodiment for the processes in the allocation component and the network monitoring component is indicated below, according to which a verification of each individual possible allocation (each individual buyer/seller pair) takes place. Further embodiments are possible, depending on the market mechanism used.

Recording of the offers as unallocated offers (allocation component): The purchase and sale offers are stored in two separate data structures (purchase offer list, sale offer list). The elements of both data structures are sorted according to the price information of the offers. Purchase offers are sorted here in descending order, whereas sale offers are sorted in ascending order.

All algorithms of the allocation component can access the data structures.

Allocation method based on quantity and price information (allocation component): The allocation algorithm iteratively processes all elements of the purchase offer list and the sale offer list.

Method for the allocation method (in pseudo-code notation):

for all purchase offers in purchase offer list do
  purchase offer: purchase offer→price=maximum purchase offer→price in purchase offer list
  for all sale offers in sale offer list do
    if purchase offer→price>=sale offer→price:
      (1) form provisional allocation with content
        purchase offer→agent
        sale offer→agent
        min (purchase offer→quantity, sale offer→quantity)
      (2) allocation taking account of capacity limits=Call:
        power flow calculation (existing allocations, provisional allocation)
        modified purchase/sale offer=Call:
          Vector allocation adjustment (allocation taking account of capacity limits)
      (3) if modified purchase offer→quantity==0: break
      end if
    else break end if
  end for
end for Adjustment of the provisional allocation vectors on the basis of the price information (allocation component): Since the validation of the capacity limits is carried out in this example embodiment by the power flow calculation for precisely one buyer/seller allocation, the allocation taking account of the capacity limits can be directly taken over in this step. Economic efficiency is guaranteed by the iterative determination of the allocation.

Vector allocation adjustment method (allocation taking account of capacity limits) in pseudo-code notation:

if allocation taking account of capacity limits→quantity>0:
  (1) send allocation notification to purchase offer→agent and sale offer→agent with content allocation→quantity
  (2) store allocation in quantity of the existing allocations
  (3) change purchase offer and sale offer as follows: if purchase offer→quantity>allocation→quantity:
    modified purchase offer: purchase offer→quantity new=purchase offer→quantity old−allocation→quantity
  end if
  if sale offer→quantity>allocation→quantity:
    modified sale offer: sale offer→quantity new=sale offer→quantity old−allocation→quantity
  end if
end if
return modified sale offer, modified purchase offer Power flow calculation (network monitoring component): The power flow calculation method (with the existing allocations and provisional allocation parameters) is based on the equation of the power balance $$0 = -P_i + \sum_{k=1}^{N} |V_i||V_k|(G_{ik}\cos\theta_{ik} + B_{ik}\sin\theta_{ik})$$

where:
$P_i$ denotes an injected power into a node i,
V denotes a voltage in a node i,
$G_{ik}$ denotes one of the active components in an admittance matrix for an element ik,
$B_{ik}$ denotes an imaginary component in the admittance matrix for the element ik,
$\theta_{ik}$ denotes a difference in the phase angle between the node i and a node k,
and on the equation of the reactive power balance $$0 = -Q_i + \sum_{k=1}^{N} |V_i||V_k|(G_{ik}\cos\theta_{ik} - B_{ik}\sin\theta_{ik})$$

where $Q_i$ is the injected reactive power.

A range of solution methods exist for this problem, e.g.
power iteration
Newton-Raphson method
Gauss-Seidel method
Fast-Decoupled Load Flow method In this connection, reference is made to Oeding et al, Elektrische Kraftwerke and Netze [*Electrical Power Stations and Networks*], 2004.

The return of the power flow calculation is the allocation taking account of capacity limits. It corresponds to the maximum quantity that can also be taken into account in addition to the existing allocations.

Further Advantages:

The approach proposed here enables a power allocation method which, already in the power procurement, takes into account congestion and simultaneously permits or takes into account a logical and physical separation of the network monitoring component and power allocation.

The approach advantageously complies with capacity restrictions without the allocation component requiring information on the network topology. The proposed power allocation method allows economically efficient balancing interventions and can be used in a distributed manner in order to enable an energy allocation or network monitoring by the players present in the local energy market, i.e. the allocation component, network monitoring component and agents.

It is furthermore advantageous that the proposed approach enables a separation of the network monitoring component and the allocation component, and an independent design of the network control sections and the power market. A plurality of network sections (with individual network monitoring components) can thus be covered by one allocation component.

It is also advantageous that the power allocation method meets regulatory requirements and is thus usable in practice.

In addition, the proposed power allocation method can be used as a continuous or periodic allocation method and thus supports all conventional power market mechanisms.

A power allocation method is thus proposed which, already in the power procurement, takes into account network congestion and simultaneously enables logical and physical separation of network control and power allocation. This is achieved in that an allocation component and a network monitoring component perform tasks relating to the allocation of power separately from one another and exchange information or intermediate states relating to the allocation via predefined interfaces, before these are actually used for the power control. This allows an adaptive power control of power sources and consumers and the flexible implementation of a multiplicity of requirements of a modern power distribution network.

Although the invention has been illustrated and described in further detail by the at least one example embodiment shown, the invention is not restricted thereto and other variations can be derived herefrom by the person skilled in the art without departing from the protective scope of the invention.

The invention claimed is:

1. A power control method, comprising:
   determining an allocation of electrical power by an allocation component on a basis of offers; providing the allocation to a network monitoring component;
   checking a feasibility of the allocation by the network monitoring component, wherein the step of checking the feasibility of the allocation by the network monitoring component includes carrying out a validation of line capacities by the network monitoring component, and the validation of line capacities comprises validating based on a power flow calculation;
   providing to the allocation component an examined allocation checked by the network monitoring component on a basis of the feasibility of the allocation; and
   instigating a power control based on the examined allocation.

2. The method according to claim 1, wherein the offers comprise at least one offer selected from the group consisting of at least one purchase offer and at least one sale offer.

3. The method according to claim 1, wherein the determining step comprises allocating the electrical power by the allocation component on the basis of the offers and on the basis of at least one of the following factors which are determined by the network monitoring component: a power flow calculation, available capacities, and power transfer distribution factors.

4. The method according to claim 1, which comprises instigating the power control on the basis of the examined allocation by checking a condition with the allocation component to determine whether the examined allocation of the network monitoring component corresponds to the allocation of the allocation component and/or a capacity of the network is not jeopardized, and:
   if the condition applies, accepting the examined allocation by the allocation component; or
   if the condition does not apply, adjusting the allocation.

5. The method according to claim 1, which comprises providing at least one offer by at least one agent.

6. The method according to claim 5, wherein an allocation requirement for at least one locally connected device is determined by the agent.

7. The method according to claim 6, wherein the agent carries out the power control of the at least one locally connected device.

8. The method according to claim 7, which comprises carrying out the power control on a basis of an allocation notification which is provided by the allocation component.

9. The method according to claim 1, wherein the examined allocation of the allocation component is provided by the network monitoring component, in which an adjustment of the allocation is carried out in the allocation component on the basis of the examined allocation.

10. The method according to claim 1, wherein:
    the examined allocation of the allocation component is provided by the network monitoring component; and
    an adjustment of the allocation is carried out in the network monitoring component on the basis of the examined allocation.

11. A power control device, comprising a processing unit configured to:
    determine an allocation of an electrical power based on offers from at least one agent; provide the allocation to a network monitoring component;
    receive an examined allocation checked by the network monitoring component carrying out a validation of line capacities, wherein the validation of line capacities comprises validating based on a power flow calculation; and
    instigate a power control on the basis of the examined allocation and thereby also based on the line capacities.

12. A power control device, comprising a processing unit configured to:
    receive an allocation from an allocation component;
    check a feasibility of the allocation by carrying out a validation of line capacities, wherein the validation of line capacities comprises validating based on a power flow calculation and
    generate an examined allocation based on the feasibility of the allocation;
    provide the examined allocation to the allocation component; and instigate a power control on the basis of the examined allocation.

13. A system for power control, comprising:
    an allocation component configured to determine an allocation of electrical power on the basis of offers;
    a network monitoring component disposed to receive the allocation of electrical power,
    said network monitoring component being configured to check a feasibility of the allocation by carrying out a validation of line capacities by the network monitoring component, wherein the validation of line capacities comprises validating based on a power flow calculation and to provide the checked allocation to the allocation component; and
    wherein the power control is instigated on the basis of the checked allocation.

* * * * *